US007221905B2

(12) United States Patent
Dent

(10) Patent No.: US 7,221,905 B2
(45) Date of Patent: *May 22, 2007

(54) DUAL MODE SATELLITE CELLULAR TELEPHONE SYSTEMS

(75) Inventor: Paul W. Dent, Stehags (SE)

(73) Assignee: Ericsson Inc., Research Triangle Park, NC (US)

( * ) Notice: Subject to any disclaimer, the term of this patent is extended or adjusted under 35 U.S.C. 154(b) by 362 days.

This patent is subject to a terminal disclaimer.

(21) Appl. No.: 10/274,763

(22) Filed: Oct. 21, 2002

(65) Prior Publication Data

US 2003/0060195 A1   Mar. 27, 2003

Related U.S. Application Data

(60) Division of application No. 08/974,233, filed on Nov. 19, 1997, now Pat. No. 6,501,939, which is a continuation of application No. 08/756,709, filed on Nov. 26, 1996, now abandoned, which is a continuation of application No. 08/305,703, filed on Sep. 14, 1994, now abandoned.

(51) Int. Cl.
 H04B 7/15   (2006.01)
 H04B 7/185   (2006.01)
 H04Q 7/20   (2006.01)
(52) U.S. Cl. .................... 455/11.1; 455/13.1; 455/426; 455/427
(58) Field of Classification Search ............... 455/427, 455/11.1, 13.1, 426

See application file for complete search history.

(56) References Cited

U.S. PATENT DOCUMENTS

| 3,517,312 | A |   | 6/1970  | Yamato et al. |
| 3,745,571 | A | * | 7/1973  | Chwastyk et al. ........... 343/7.7 |
| 4,353,119 | A | * | 10/1982 | Daniel et al. ............... 364/517 |
| 4,672,655 | A |   | 6/1987  | Koch .......................... 379/57 |
| 4,931,977 | A | * | 6/1990  | Klemes ...................... 364/581 |
| 4,972,457 | A | * | 11/1990 | O'Sullivan .................. 379/59 |
| 4,979,170 | A |   | 12/1990 | Gilhousen et al. ........ 370/104.1 |
| 4,991,197 | A | * | 2/1991  | Morris ........................ 379/58 |
| 5,048,059 | A | * | 9/1991  | Dent ........................... 375/94 |

(Continued)

FOREIGN PATENT DOCUMENTS

WO   WO89/04569   5/1989

(Continued)

OTHER PUBLICATIONS

America On-Line, "Odyssey Satellite Based Worldwide Wireless Telephone Systems", May 1995.*

(Continued)

Primary Examiner—William D. Cumming
(74) Attorney, Agent, or Firm—Myers Bigel Sibley & Sajovec, PA

(57) ABSTRACT

A dual-mode telephone with a satellite communication adapter is disclosed. According to one embodiment of the present invention, a cellular-type handportable phone is equipped with a connector for the attachment of accessories. This connector provide a satellite communications adapter accessory access to the handset's signal processing resources which may operate in an alternative mode to process signals received from the satellite and converted by the adapter into a suitable form for processing. The processing translates the satellite signals into voice or data, and vice-versa.

7 Claims, 8 Drawing Sheets

U.S. PATENT DOCUMENTS

| | | | |
|---|---|---|---|
| 5,073,972 A | 12/1991 | Tendler et al. | |
| 5,084,669 A | 1/1992 | Dent | |
| 5,117,450 A | 5/1992 | Joglekar et al. | 379/58 |
| 5,180,993 A | 1/1993 | Dent | |
| 5,220,275 A | 6/1993 | Holmqvist | |
| 5,303,286 A * | 4/1994 | Wiedeman | 379/59 |
| 5,347,286 A | 9/1994 | Babitch | 342/359 |
| 5,410,728 A | 4/1995 | Bertiger et al. | 455/13.1 |
| 5,412,660 A | 5/1995 | Chen et al. | 370/110.1 |
| 5,428,668 A | 6/1995 | Dent et al. | |
| 5,448,623 A | 9/1995 | Weidman | 379/59 |
| 5,490,284 A * | 2/1996 | Itoh et al. | 455/11.1 |
| 5,526,402 A * | 6/1996 | Dent et al. | 379/59 |
| 5,530,722 A | 6/1996 | Dent | |
| 5,533,097 A * | 7/1996 | Crane et al. | 379/58 |
| 5,539,730 A | 7/1996 | Dent | 370/29 |
| 5,544,223 A | 8/1996 | Robbins et al. | 379/58 |
| 5,544,226 A | 8/1996 | Weis et al. | 379/61 |
| 5,551,624 A | 9/1996 | Horstein et al. | 244/158 R |
| 5,586,165 A * | 12/1996 | Wiedeman | |
| 5,598,575 A | 1/1997 | Dent et al. | 395/800 |
| 5,610,559 A * | 3/1997 | Dent | 331/2 |
| 5,628,049 A * | 5/1997 | Suemitsu | 455/11.1 |
| 5,742,908 A | 4/1998 | Dent | 455/517 |
| 5,745,523 A | 4/1998 | Dent et al. | 375/216 |
| 5,760,739 A | 6/1998 | Pauli | 342/359 |
| 5,884,140 A * | 3/1999 | Ishizaki et al. | 455/12.1 |
| 5,903,835 A * | 5/1999 | Dent | 455/427 |
| 6,134,437 A | 10/2000 | Karabinis et al. | 455/427 |
| 6,148,193 A * | 11/2000 | Miska et al. | 455/410 |
| 6,501,939 B1 * | 12/2002 | Dent | 455/11.1 |
| 6,529,707 B1 * | 3/2003 | Dent | 455/13.1 |
| 2003/0060195 A1* | 3/2003 | Dent | 455/426 |

FOREIGN PATENT DOCUMENTS

WO     WO91/15071     10/1991

OTHER PUBLICATIONS

America On-Line, "Portable, Global Two-Way Telephone, Fax and Data Communications", Jun. 1995.*

America On-Line, "Satellite-Based Cellular Telephone System", Nov. 1995.*

Drucker, E.H. et al., "Integration of Mobile Satellite and Cellular Systems," *International Mobile Satellite Conference IMSC '93*, pp. 119-124, Jun. 16-18, 1993, Pasadena, CA.

* cited by examiner

HANDSET-TO-ADAPTER FORMAT: 25 BIT WORDS

| | | | |
|---|---|---|---|
| 1 | SYNC | | |
| 0 | DATA | $I_1$ | $Q_1$ |
| 0 | DATA | $I_2$ | $Q_2$ |
| 0 | DATA | $I_3$ | $Q_3$ |
| 0 | DATA | $I_4$ | $Q_4$ |
| 1 | SYNC | $I_5$ | $Q_5$ |
| 1 | SYNC | $I_6$ | $Q_6$ |
| | | $I_7$ | $Q_7$ |
| . | . | . | . |

32 BIT (4-BYTE) COMMAND WORD

FIG. 6

DUAL MODE SATELLITE CELLULAR TELEPHONE SYSTEMS

CLAIM FOR PRIORITY AND CROSS-REFERENCE TO OTHER APPLICATIONS

This application is a divisional of continuation application Ser. No. 08/974,233, filed Nov. 19, 1997, now issued U.S. Pat. No. 6,501,939 to Dent on Dec. 31, 2002, which is a continuation of application Ser. No. 08/756,709, filed Nov. 26, 1996 now abandoned, which is a continuation of application Ser. No. 08/305,703; filed Sep. 14, 1994 now abandoned, the disclosures of which are hereby incorporated herein by reference.

FIELD OF THE DISCLOSURE

The present invention relates to the construction of portable wireless communication devices, and in particular to portable wireless communication devices for communicating through orbital satellites.

BACKGROUND OF THE DISCLOSURE

Prior art-satellite terminals are large and expensive. For example, a terminal conforming to the standards known as INMARSAT-M is about the size of a small suitcase and costs approximately $10,000 in 1993. Such a terminal comprises a deployable directional antenna that has to be pointed to the satellite with no intervening obstruction in the line-of-sight, a telephone handset, and a box of electronics and batteries which is coupled to the antenna and to the handset by wires.

Cordless telephones are well known in the domestic context, and allow a user more freedom of movement than conventional telephones. Cellular telephones extend the benefits of wireless communications over wide areas, and can be used in moving vehicles. U.S. patent application Ser. No. 5,428,668 describes an inventive combination of cellular and cordless phone technology which allows the same, cellular handportable telephone to be used both in the wide-area, mobile context, and as a home cordless phone. In addition, the telephone can receive calls either via the cellular system or via the normal home telephone system. In the latter case, the calls are translated to low-power cellular telephone call signals which can be broadcast using the same frequency bands as the wide-area cellular system without causing interference.

The above systems do not disclose translating calls from a satellite communications system into low power cellular call signals in order to receive them using a normal cellular handset.

U.S. patent application Ser. No. 07/967,027, now issued U.S. Pat. No. 5,745,523 to Dent et al., on Apr. 28, 1998, discloses a dual-mode cellular phone capable of operating in an analog FM mode or alternatively in a TDMA Digital speech mode, by using alternative signal processing programs in a programmable digital signal processor. In both cases, the FM or TDMA signal to be processed is received over the air using the same radio hardware.

U.S. patent application Ser. No. 08/305,780, filed on Sep. 14, 1994 and entitled "Dual-Mode Satellite/Cellular Phone With A Frequency Synthesizer", now issued U.S. Pat. No. 5,535,432 to Dent on Jul. 9, 1996, describes a dual-mode satellite/cellular telephone that comprises a satellite RE processing section, a cellular RF processing section, and a common signal processing section that can operate to process either satellite or cellular signals. This device locks preferentially to landcellular signals, if available, and if not, alternatively to satellite signals.

The systems described above, however, do not describe a dual-mode satellite-cellular phone comprising a cellular handset adapted to interface with a satellite adapter unit, wherein said handset receives signal for processing from said adapter unit by means of suitable cables.

SUMMARY OF THE DISCLOSURE

It is an object of the present invention to provide a dual-mode telephone with a satellite communication adapter. According to one embodiment of the present invention, a cellular-type handportable phone is equipped with a connector for the attachment of accessories. According to the present invention, this connector provides satellite communications adapter accessory access to the handset's signal processing resources which may operate in an alternative mode to process signals received from the satellite and converted by the adapter into a suitable form for processing. The processing translates said satellite signals into voice or data, and vice-versa.

The present invention provides a number of options. First, the present invention provides a low cost option that involves omitting landcellular-related components from the handset to provide the lowest cost satellite-only communications device. A second option comprises a second adapter similar to that described in U.S. Pat. No. 5,428,668, which is incorporated herein by reference, additionally equipped with the interface to the satellite adapter. This adapter translates received satellite signals into cellular-type signals which are rebroadcast for reception by the handportable cellular phone, and vice-versa. A third option comprises connection of said "Home Base Station" also to the Public Switched Telephone Network via a normal telephone jack outlet, such that calls received either via the satellite or via the PSTN are translated into cellular-type or wireless calls to the handset.

According to one embodiment of the present invention, a dual-mode telephone device for communicating either through an orbiting satellite or through a landcellular system is disclosed. The telephone device includes a cellular telephone unit adapted for communicating in a cellular telephone network and further adapted to generate and to process digitized signals corresponding to transmissions to and from said satellite. In addition, the telephone device comprises satellite communications adapter means for receiving signal transmitted by the satellite and converting them to said digitized signals for processing by the cellular telephone unit and for receiving said digitized signals from said cellular telephone unit and converting them to transmissions to the satellite.

According to another embodiment of the present invention, a satellite communications adapter means is disclosed. The adapter means comprises directional antenna means and means for pointing said directional antenna means toward an orbiting satellite. Transmit-receive connection means connect the antenna to receiving and transmitting circuits. The adapter further comprises receive downconverting means adapted to receive a satellite signal via the transmit-receive connection means and to process them into a form for connection to a handset using a flexible cable. Transmit modulation and amplifying means are also provided for receiving complex modulating signals from the handset using the flexible cable and for upconverting them and amplifying them for transmission using the directional antenna to the satellite.

DETAILED DESCRIPTION OF THE DRAWINGS

These and other features and advantages of the invention will be readily apparent to one of ordinary skill in the art from the following written description, used in conjunction with the drawings, in which:

FIG. 6 illustrates serial data submultiplex format according to the present invention;

DETAILED DESCRIPTION OF THE DISCLOSURE

Figure 1:
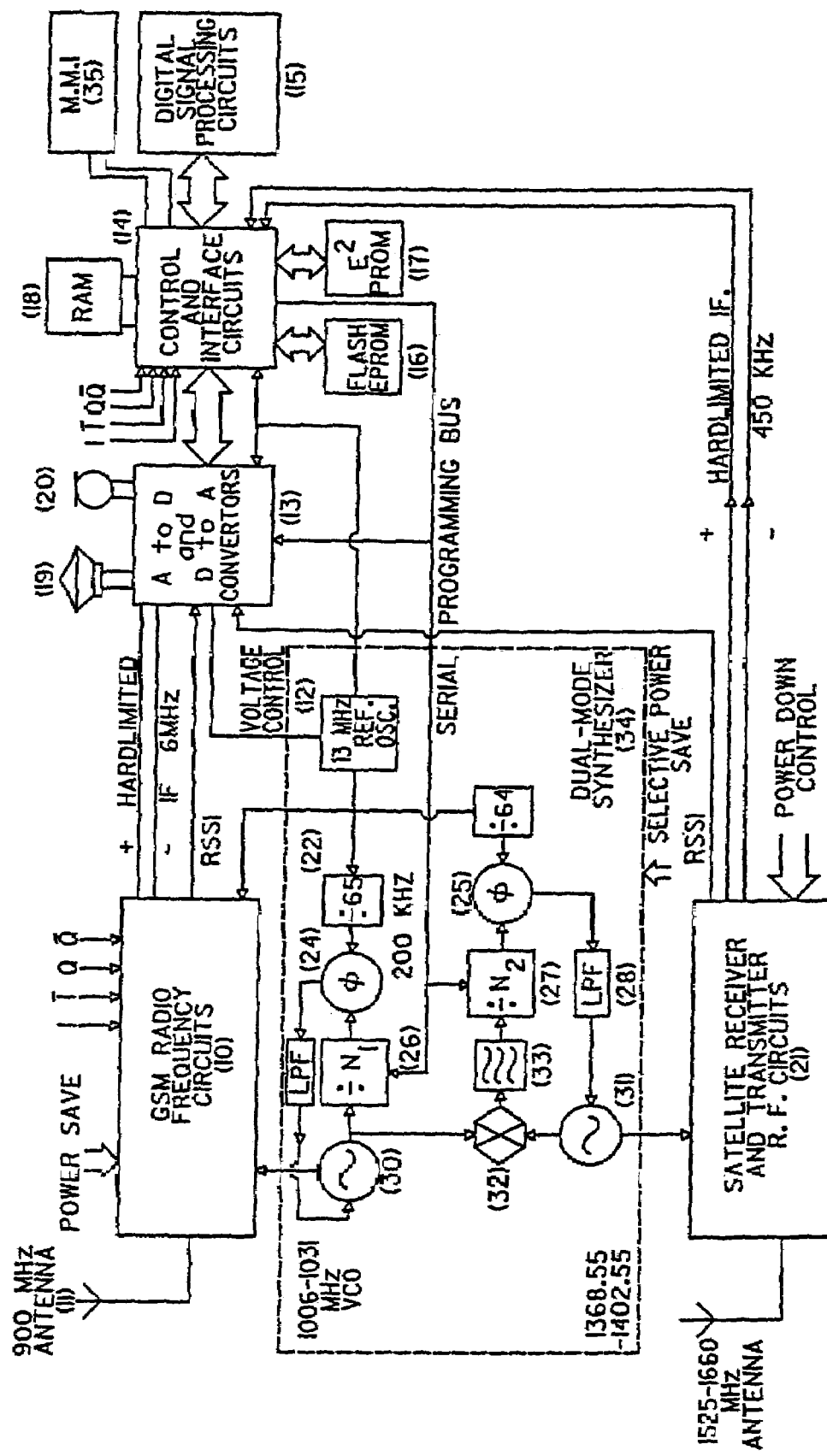
FIG. 1 illustrates a dual mode satellite-cellular phone.

The operation of a satellite-cellular portable phone according to U.S. patent application Ser. No. 08/305,780, entitled "Dual-Mode Satellite/Cellular Phone With A Frequency Synthesizer", now issued U.S. Pat. No. 5,535,432 to Dent on Jul. 9, 1996, which is expressly incorporated herein by reference, is explained with the aid of FIG. 1. A cellular transmitter-receiver RE circuit 10, which may, for example, be adapted to the European GSM standard operating at frequencies of 900 MHz (Europe), 1800 MHz (UK DCS 1800 system) or 1900 MHz (U.S.) is connected to a cellular antenna 11. The following description is based or the cellular mode conforming to the 900 MHz GSM standard, but this is merely exemplary and any cellular standard can be used for the present invention. A synthesizer 34 supplies a local oscillator signal to the cellular-mode RE circuits in the range 1006–1031 MHz in 200 KHz steps which is derived by dividing the output of a 13 MHz reference oscillator 12 by 65 in divider 22. A phase detector 24 compares this 200 KHz reference signal with the output of a VCO 30 divided by a variable integer Ni in a divider 26. The phase error from a phase detector 24 is filtered in a loop filter 29 and then applied to a control VCO 30 such that its frequency is Ni times 200 KHz.

The GSM receiver part of the cellular transmitter-receiver RF circuit 10 in this example converts received signals first to an intermediate frequency of 71 MHz by mixing with the synthesized local oscillator frequency and then to a second intermediate frequency of 6 MHz by mixing with 65 MHz, which is 5 times the 13 MHz reference. The second IF signal is processed to extract an RSSI signal which is approximately proportional to the logarithm of the amplitude. This can be done either by using a radar-type logarithmic IF amplifier or by use of a fast, automatic gain control. In the former case, a hardlimited IF output is also obtained from which amplitude variations have been erased; in the latter case, an amplitude-controlled output is obtained, from which amplitude variations have been substantially reduced by the automatic gain control. The former case is the preferred implementation, in which a hardlimited IF signal is produced.

The IF output signal is processed in an AtoD convertor 13 to extract numerical values related to the instantaneous signal phase, for example, COS(PHI) and SIN(PHI) and these are combined with the result of analog-to-digital conversion of the RSSI signal and transferred via interface circuits 14 to the digital signal processing circuits 15. A suitable method of performing the above radio signal digitization is disclosed in U.S. Pat. No. 5,048,059, filed Sep. 18, 1989, which is incorporated herein by reference. The signal is processed to form PCM voice samples which are transferred back via interface circuits 14 to the DtoA convertor 13 and then to an earpiece 19.

In the cellular transmit direction, a microphone 20 supplies voice signals to the AtoD convertor 13 where the voice signals become digitized and transferred via interface circuits 14 to digital signal processing circuits 15 for coding. The coding reduces the bitrate for transmission and the reduced bitrate signal is transferred back through interface circuit 14 where it is converted into I,I,Q,Q modulating signals. The modulating signals are fed to the GSM transmitter-part of the RF circuit 10 where they are converted to the 890–915 MHZ range for transmission via an intermediate frequency of 117 MHz, which is 9 times the 13 MHz reference frequency.

The control and interface circuits 14 also contain a microprocessor coupled to a RAM 18, a flash program memory 16 and an EEPROM 17, as well as to a man-machine interface 35 which may, for example, be a keypad and display. The RAM 18 may be used in a shared fashion by the microprocessor and by the digital signal processing circuits 15 according to the advantageous method disclosed in U.S. Patent continuation application Ser. No. 08/626,911, filed Apr. 15, 1996, entitled "Multiprocessor RAM Sharing", now issued U.S. Pat. No. 5,598,575 to Dent et al. on Jan. 28, 1997, which is incorporated herein by reference.

In the GSM mode, the satellite communications circuits 21 are powered down by control signals from the control interface circuit 14 to save power, as are other unused parts of the dual-mode synthesizer, such as the VCO 31. Many other battery-power saving features are also incorporated, and in particular the phone when in standby mode can be powered down for most of the time and only wake up at predetermined instants to read messages transmitted by GSM base stations in its allocated paging time slot.

When the phone, in idle mode, detects that all GSM base stations are becoming weak, the phone employs idle time between GSM waiting periods to activate the satellite circuits to search for a satellite calling channel signal. The satellite receiving circuits 21 receive a local oscillator signal from a synthesizer 34. By mixing with the synthesizer's second output, the satellite receiver circuits convert received signals to a first intermediate frequency (IF) of 156.45 MHz and then to a second IF of 450 KHz by mixing with 12 times the 13 MHz reference. The satellite mode channel spacings in this example are (13 MHz/64×65–3.125 KHz). The second IF is hardlimited and processed to extract an RSSI signal approximately proportional to the logarithm of the signal amplitude. The hardlimited IF is further processed in the control and interface circuit 14 to extract signals related to instantaneous signal phase. These are combined with digitized RSSI signals from the AtoD converter 13 and passed to the digital signal processing circuits (15) where they are processed to detect satellite signals. If satellite signals are detected and GSM signals are weak, the phone sends a deregistration message to the GSM system and/or a registration message to the satellite. These aspects are described in U.S. patent application Ser. No. 08/179,958, entitled "Position Registration For Cellular Satellite Communication Systems", abandoned in favor of continuation application Ser. No. 08/754,382, now issued U.S. Pat. No. 6,542,716 to Dent et al., on Apr. 1, 2003, which is incorporated herein by reference.

Upon deregistration from GSM, the GSM circuits in the phone are turned off and the satellite receiver and relevant parts of the synthesizer are powered up to listen to the narrowband satellite control/paging channel. Preferably this channel is also formatted in such a way that the receiver only needs to power up to receive a particular timeslot assigned for paging that mobile phone. This conserves battery power in idle mode, especially if fast synthesizer lock times from momentary power up can be achieved. Moreover, some of the spare time between paging slots in the satellite format can be devoted to scanning GSM frequencies for the reappearance of a GSM base station signal, which would trigger a reversion to the cellular mode. The cellular mode is the preferred mode since it is desirable to minimize the number of subscriber telephones that use the capacity-limited satellite system at any one time. In this way, only a small percentage of phones temporarily outside of cellular coverage represent a potential load on the satellite capacity, so the number of dual-mode phone subscribers can be many times greater than the capacity of the satellite system could support.

Because of the difficulty of obtaining a reference frequency oscillator of adequate stability, small size, and low cost for a portable phone, it is customary to utilize the base station signal as a reference and to lock the phone's internal reference frequency to the received base station signal by generating an AFC signal as shown in FIG. 1 as "voltage control" from the DtoA convertor 13 to the reference oscillator 12.

The above system description was based on a 3.125 KHz channel-spaced satellite mode. This is determined by the divider values of dividers 22 and 23, in this case 65 and 64, respectively. The first divider ratio arises due to GSM bitrates being based on a 13 MHz reference clock which is 65 times the channel spacing. For a Vernier loop synthesizer, the second divider ratio is 1 away from the first, i.e., 64 or 66. A divider ratio of 64 in this case is a rational choice.

Figure 2:
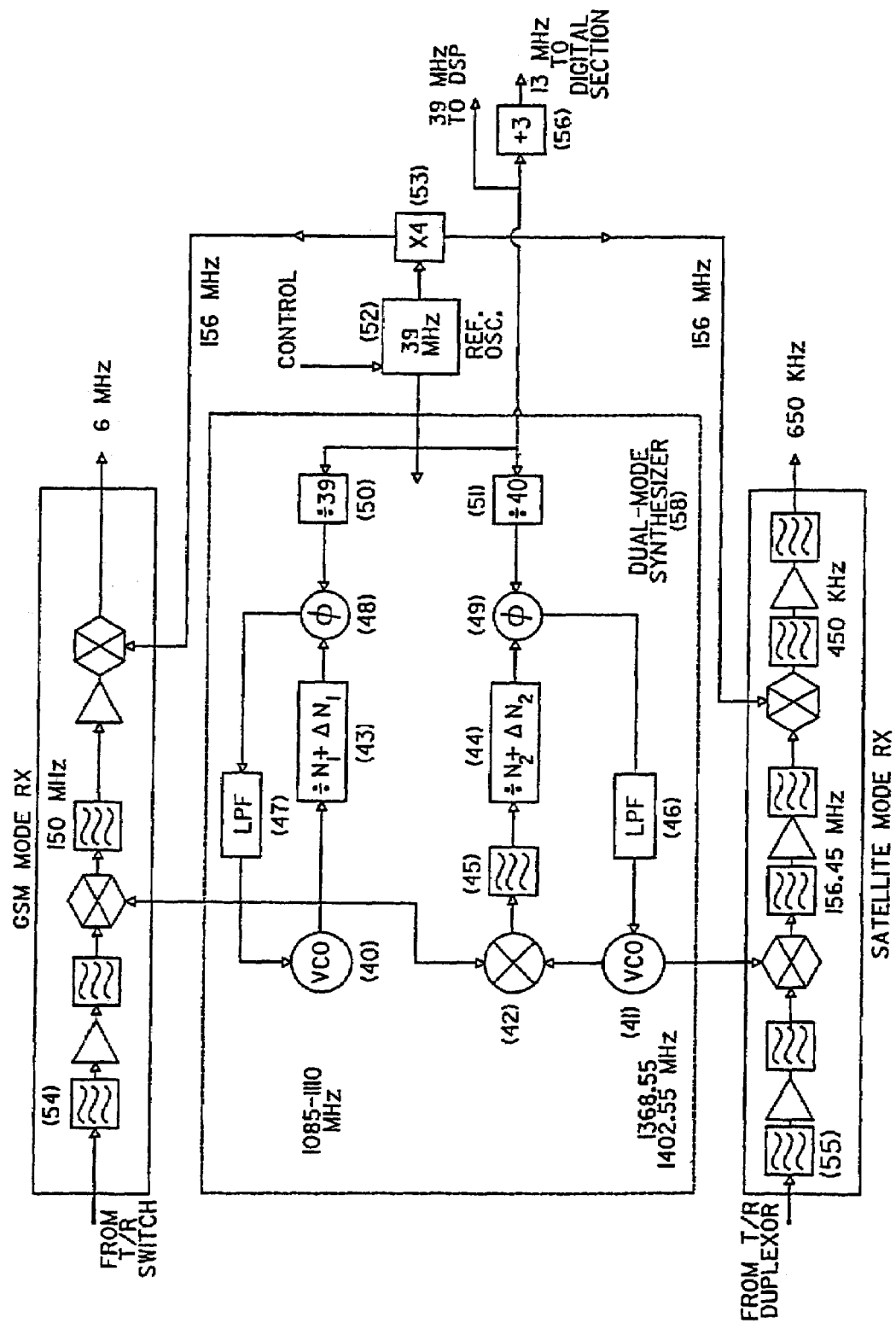
FIG. 2 illustrates a frequency plan for 5 KHz channel spacing in the satellite mode.

It is also possible to configure the dual-mode phone described above for 5 KHz satellite mode channel spacing. In this case, a 39 MHz reference oscillator may be used. This embodiment is shown in FIG. 2, where only RF circuitry and the synthesizer are shown. The baseband elements 13, 14 and 15 remain as previously described.

The 39 MHz reference oscillator 52 is divided by 39 and 40 in digital dividers 50 and 51, respectively. The divider 50 thus produces a 1 MHz reference frequency for a phase comparator 48. A first VCO 40 which produces a local oscillator suitable for the GSM mode, is divided by N1+dN1 in a fractional-N divider 43 operating as disclosed in U.S. Pat. No. 5,180,993. The value dN1 can be programmed from 0 to 4/5 ths in steps of 1/5$^{th}$ so that VCO 40 is controlled to be N1+dN1 times 1 MHz in 200 KHz steps.

A second VCO 41 operates to generate a suitable local oscillator signal for the satellite mode. It is mixed down to the 280–300 MHz range against a VCO 50 in a mixer 42 and then after low-pass filtering in a filter 45 is divided in a divider 44 by N2+dN2 in steps of 1/5th. The divided output is compared in a phase detector 49 with the output of the divider 51 and the error signal from 49 is filtered in a loop filter 46 before application to the control VCO 41 such that its frequency is (N2+dN2)39 MHZ/40+VCO(50) frequency.

Thus, the frequency of VCO 51 is given by $$\left[\frac{n1}{39 \times 5} + \frac{n2}{40 \times 5}\right] \times 38 \text{ MHz} =$$

$$\frac{5 \times 40 \times n1 + 5 \times 39 \times n2}{39 \times 5 \times 40 \times 5} \times 39 \text{ MHz} = 40n1 + 39n2 \times 5 \text{ KHz}$$

where n1=5(N1+dN1) and n2=5(N2+dN2). Thus, by varying the integers n1 and n2, frequencies can be generated in 5 KHz steps, as required for the postulated narrowband satellite mode. This desired behavior was obtained using a combination of fractional-N and Vernier Loop techniques to achieve both 200 KHz and 5 KHz steps simultaneously at respectively cellular and satellite frequency bands. Both synthesizer loops operate with reference frequencies around 1 MHz and can have wide loop bandwidths to suppress phase and frequency noise and to achieve fast frequency switching times.

The output of the VCO 40 between 1085 MHz and 1110 MHz mixes with the GSM received signals in the band 935–960 MHz to generate a 150 MHz first intermediate frequency (IF). This is chosen deliberately so that the second local oscillator of 156 MHz used to convert the first IF to a second IF of 6 MHz is a simple multiple (×4) of the 39 MHz reference frequency crystal, produced by a frequency multiplying circuit 53. Alternatively, it can be advantageous to use a 156 MHz crystal reference oscillator and instead to divide it down by 4 to generate the required 39 MHz. As another alternative, any frequency multiplying circuit can of course be implemented with the aid of either a harmonic generator plus harmonic selection filter, or with the aid of a simple phase lock loop. It will be noted that the second local oscillator is chosen to be the same frequency for the cellular and satellite receiver sections for economy.

The satellite receive section 55 effects amplification and filtering of the satellite received signal band of 1525–1559 MHz which is then mixed down against the VCO 41 output to generate a fixed IF of 156.45 MHz. This is further mixed down against the 156 MHz second local oscillator to generate the final IF of 450 KHz. It is also possible to use the more standard 455 KHz by merely programming the satellite synthesizer one 5 KHz step lower in frequency and choosing the first IF to be 156.455 MHz.

The final IFs of either 6 MHz (GSM) or 450 KHz (satellite) are digitally processed as previously described. The digital processing can be supplied with a 13 MHz clock, from which all GSM bitrates and frame periods derive, by dividing the 39 MHz reference frequency by 3 using a divider 56.

Further description of this prior invention, such as transmit processing, may be found in the above-referenced patent application which was incorporated herein above.

This prior invention was conceived to provide a dual-mode, satellite-cellular phone that switched between satellite and cellular modes according to signal availability, which is a function of mobile position. An implicit requirement of satellite-to-handportable or mobile communications is that the satellite be powerful enough to communicate with phones having arbitrarily oriented antennas, i.e., omnidirectional antennas.

On the other hand, the present invention aims to provide a satellite link using existing satellites of limited power, which require a directional antenna to be used at the telephone terminal. The present invention is not therefore concerned with solving the problem of providing a dual-mode phone which automatically switches between satellite and cellular modes according to signal availability changing due to moving position, but rather is concerned with providing a directional antenna for a satellite mode, the mobility of which is restricted due to the antenna being inherently large, and to the need for the antenna to be pointed at the satellite. It is clearly not appropriate to attach such an antenna to the telephone handset which is lifted to the user's ear. On the other hand, this was appropriate in the case of the previous invention where a small omni-directional antenna sufficed.

One solution would be to employ a stand-alone antenna connected to a handset according to the prior invention by means of a coaxial cable. However, the diameter of a coaxial cable with sufficiently low loss at around 2 GHz is inconvenient. The cable size could be reduced by including a low-noise amplifier as part of the antenna for the receive direction. The transmit direction also requires low loss and so the transmit power amplifier should preferably also be located in the antenna, as then must the transmit-receive duplexing filter in the case of a frequency-duplex system. However, two coaxial cables are then needed to carry separately the output of the low noise amplifier to the handset as well as the power amplifier drive signal from the handset.

Figure 3:
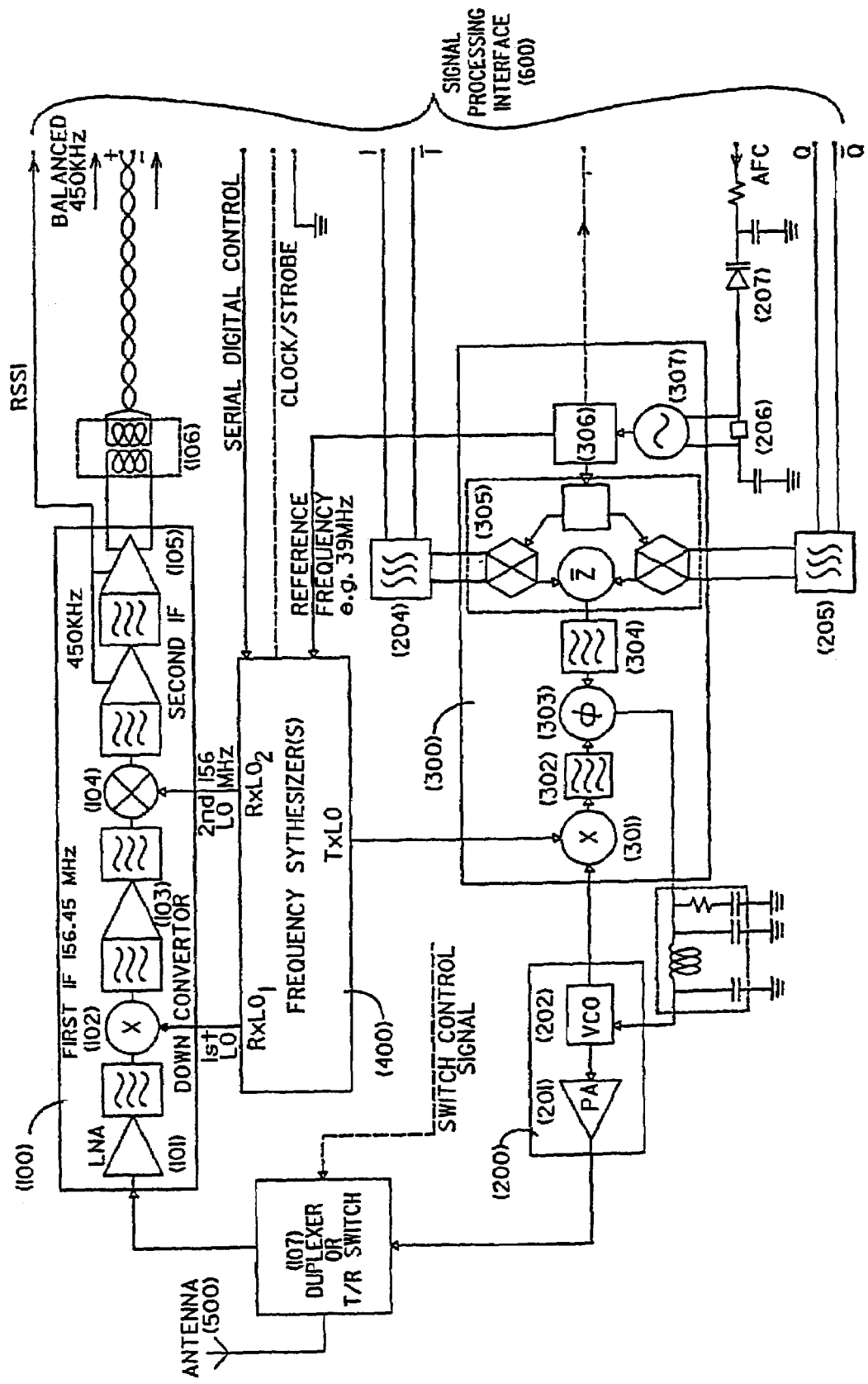
FIG. 3 illustrates a dual mode phone according to one aspect of the present invention.

The above dilemma is solved by configuration of a satellite communications adapter according to the invention which will now be described with reference to FIG. 3.

A directional antenna 500 is connected via a duplexer or a transmit/receive switch 107 to receive processing circuits 100 and transmit circuits 200. The unit 107 is appropriately a duplexing filter for frequency duplex systems or a T/R switch for time-duplex systems. The receive processing circuits 100 convert received satellite signals to a low intermediate frequency, for example 450 KHz, using a double-superheterodyne comprised of a low noise amplifier 101, an image rejection filter and mixer or image rejection mixer 102, first IF filters and amplifiers 103, a second mixer 104 and second IF filters and amplifiers 105. A balanced output from the second IF amplifier assists in avoiding unwanted feedback to the input of the high gain second IF amplifier. A transformer 106 may optionally be used to interface the balanced IF signal to a cable for connection to remote signal processing.

The transmitter comprises a transmit signal generator 300 and a transmit power amplifier 200. The transmit configuration illustrated here is a version for constant-envelope signals, as versions for both constant envelope and varying amplitude signals were disclosed in the aforementioned prior application which has already been incorporated herein by reference.

The constant envelope transmit circuit generates the purely phase modulated signal first at a convenient transmit IF produced by a TXIF generator 306 and modulated using a quadrature modulator 305. The power amplifier 200 comprises its own transmit frequency voltage controlled oscillator 202 which drives a power amplifier 201. A sample of the VCO 202 signal is downconverted to the convenient TXIF by mixing in a mixer 301 with a local oscillator signal produced by a synthesizer unit 400. The TXIF signal from the mixer 301 is compared with the modulated TXIF signal from the modulator 305 using a phase detector 303 to produce a phase error signal. The phase error signal is filtered using a loop filter 203 to produce a control signal for the VCO 202 which controls the VCO phase and frequency to follow closely that of the modulated TXIF. Thus, the modulation is transferred to the VCO's output signal and hence to the amplified output of the power amplifier PA 201.

The frequency synthesizer unit 400 is programmable by means of a serial digital control stream to generate various receive and transmit Local Oscillator frequencies so that the inventive adapter operates on allocated frequencies in the satellite transmit and receive bands, respectively. These frequencies are generated with the help of a crystal reference frequency produced by a crystal 206 and an oscillator 307, any necessary buffer amplifiers or frequency multiplications necessary to drive the synthesizer being implicitly contained in block 306. For example, a 13 MHz crystal could be used, and block 306 can comprises a TXIF synthesizer as well as a times 3 multiplier to produce a 39 MHz reference for the synthesizer unit 400, which can employ the inventive vernier-fractional-N principle disclosed in the aforementioned application. The crystal oscillator furthermore is controllable in frequency over a small range by means of a varactor diode 207 connected to an AFC control line. The purpose of this is to compensate for crystal frequency tolerances and temperature variations.

It is disclosed in U.S. patent application Ser. No. 07/967,027, now issued U.S. Pat. No. 5,745,523 to Dent and Ekelund on Apr. 28, 1998, and claimed in U.S. Pat. No. 5,530,722, that a quadrature modulator may advantageously employ balanced I,Q input drive signals. These four signals denoted in FIG. 3 by I,I,Q,Q complete the definition, apart from possible ground pins, power supplies, on/off control etc., of the principal signals forming interface 600 with remote signal processing located in the handset.

An inventive interface between a satellite RE adapter and a handset containing signal processing according to the above description comprises one embodiment of the present invention. An interface comprised of say 12 pins, all signals being of low bandwidth and of convenient levels is a reasonably practical solution. Reducing pin count is always a design goal however as there may be other functions not considered above that have from time to time to be accessed through the same connector, such as plugging the handset into a charger or a cellular vehicular adapter. Furthermore, an inventive interface of the first type has not addressed the AFC problem of a dual-mode cellular-satellite phone, a solution for which is disclosed in U.S. patent application Ser. No. 08/305,784, filed Sep. 14, 1994 and entitled "Frequency Error Correction In a Satellite-Mobile Communications System", now issued U.S. Pat. No. 5,742,908 to Dent on Apr. 21, 1998, which is incorporated herein by reference. This discloses a dual-mode terminal having a single reference frequency crystal oscillator which is controlled to an exact frequency by measuring a frequency error from the cellular system, so that the frequency is already nearly correct when attempting to access the satellite system, or alternatively locks to the satellite system and determines a frequency en-or and a Doppler shift due to satellite motion, and after compensating said Doppler shift adjusts said reference frequency oscillator to a correct absolute frequency for later accessing the cellular system.

In the present invention, however, there may be separate reference frequency oscillators for satellite and cellular modes. A reference oscillator must be included in the handset if it is intended to function as a wireless telephone when not connected to the satellite adapter. It is possible to feed this reference oscillator from the handset to the satellite adapter using another wire but this is a high frequency signal and so it may be undesirable. Nevertheless, it would be desirable to be able to ensure that a separate reference oscillator in the satellite adapter could be adjusted to the same absolute accuracy as the reference oscillator in the handset, so that they behaved as one frequency reference capable of being updated either by receiving a cellular or a satelllite signal, as disclosed in the aforementioned disclosure which is incorporated herein by reference.

Figure 4:
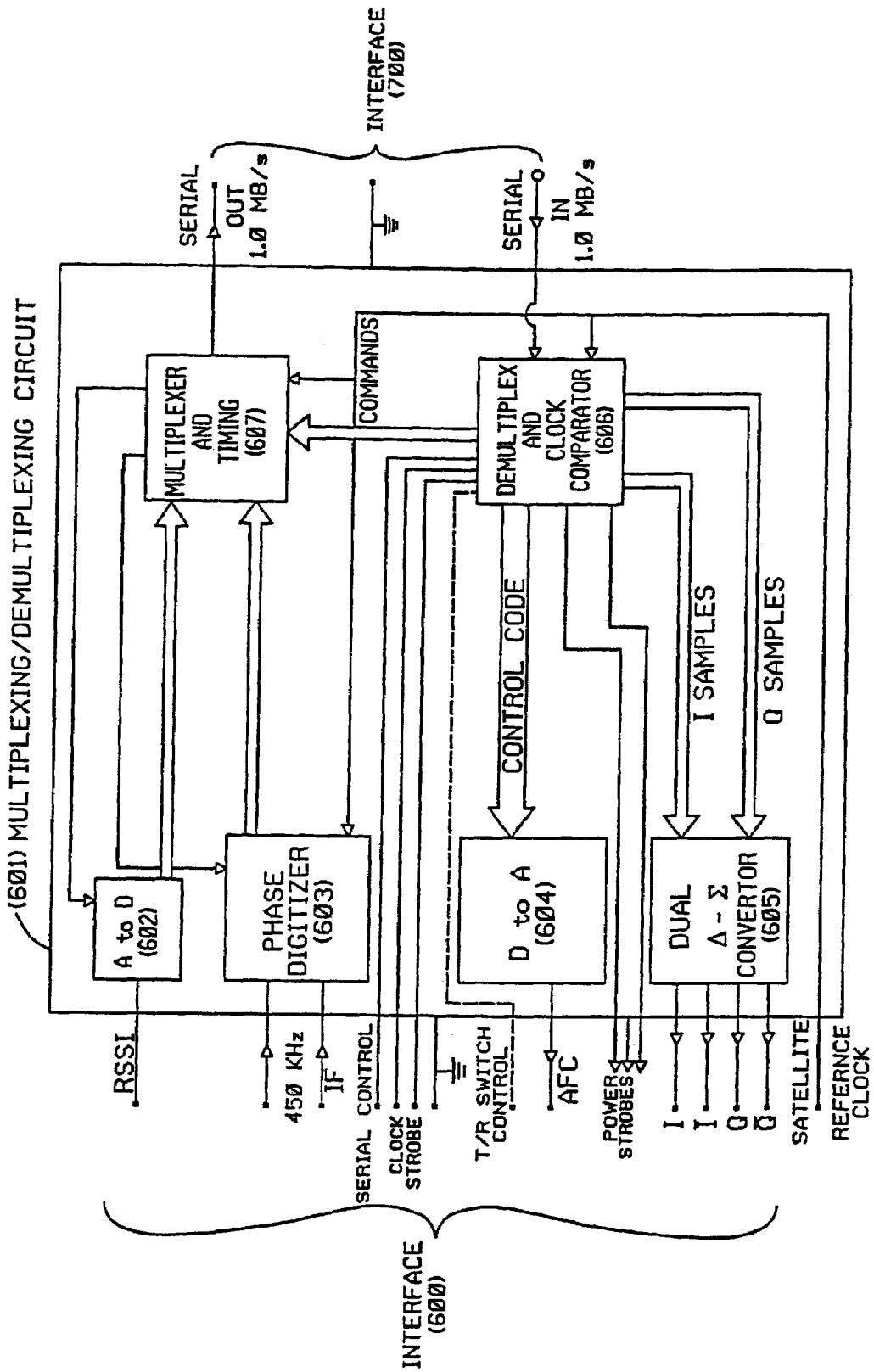
FIG. 4 illustrates a wireless adapter according to the present invention.

An alternate inventive interface is now described with the aid of FIG. 4 which aims to reduce the pin count and also to provide a means to synchronize separate reference oscillators. FIG. 4 illustrates a multiplexing/demultiplexing circuit that may be included in the inventive satellite communication adapter to reduce the number of wires needed to connect the adapter to the handset. The multiplexing circuit 601 connects to the previously described interface 600 on the left of FIG. 4. The received signal strength measure denoted by RSSI is converted from an analog waveform to numerical samples by sampling and digitizing using an AtoD convertor 602. The hardlimited IF output from second IF amplifier 105 contains phase information which is extracted, for example, by means of a direct phase digitizer 603 that can operate according to the principles disclosed in U.S. Pat. Nos. 5,084,669 or 5,220,275, which are both incorporated herein by reference. Alternatively, phase-representative information can be extracted from the saturated IF output in the form of numerical values of the cosine and sine of the instantaneous phase, as disclosed in U.S. Pat. No. 5,048,059 which is also incorporated herein by reference. The latter may be extracted by, for example, low-pass filtering the IF output to obtain a sinusoidal waveform and then quadrature sampling it by digitizing sample pairs taken nominally ¼ cycle apart. U.S. Pat. No. 5,048,059 discloses how the RSSI or logamplitude signal may be processed together with the phase-related signals to preserve the complex vector nature of the signal. In the following, it is assumed that a phase digitizer 603 outputs in 8-bit phase samples and that RSSI digitizer 602 outputs in 8-bit logamplitude samples, however the present invention is not limited thereto, which could equally well be configured to use Cartesian (I,Q) digitization of received signals. The method of digitizing the received signal is a matter of design choice, but the logpolar method of the U.S. Pat. No. 5,048,059 is the preferred method. The digitized received signal samples are multiplexed together with other bits by a multiplexer 607 to obtain a single serial digital stream for sending to the handset. The other bits multiplexed by the multiplexer 607 can be status bits or echos or acknowledgements of information or commands received on the bit-serial link from the handset. Such looped-around bits can be used by the handset to detect whether the inventive adapter is connected and performing as expected.

The serial link from the handset carries multiplexed information comprising the I and Q modulation samples, AFC words for the DtoA convertor 604, frequency setting words for synthesizer(s) 400 and control bits for the multiplexer and timing generator 607. The control bits can, for example, be used to program particular sample times or sample rates for the logpolar digitizer 603.

The I,Q samples received by a demultiplexer 606 over the bit-serial link are a complex numerical representation of the modulated signal to be transmitted to the satellite. This signal may be a digitally modulated signal using QPSK or Offset QPSK, for example. The sample rate of the I,Q streams must be at least the Nyquist rate appropriate to the I,Q signals' bandwidth, but is preferably many times higher (e.g., 4 to 40 times) in order to simplify filters 204 and 205 which attenuate sample rate components while passing the signal bandwidth. In order to avoid an excessive bitrate for the serial bitstream, this so-called oversampling factor can be kept to a modest value such as 5, and a converter 605 can comprise upsampling or interpolation to raise the oversampling rate locally. The main function of the Delta-Sigma convertors 605 is, however, to assist in the conversion of the digital I,Q sample streams to separate, analog I,Q modulating waveforms. This is done by converting the I and Q sample streams first to high bitrate delta-sigma bitstreams that represent the I,Q values by the proportion of 1's or 0's that the streams contain. A maximum level I signal would consist of continuous 1's (100% duty factor) while the maximum negative value would be continuous 0's. Because between 1 and 0 there is no negative voltage, the I and Q streams are each converted into two complementary streams I,Q and I,Q that each have a duty factor lying between 0 and 100% but which vary inversely. The I signal is then represented in the difference in duty factor between the I and the I stream, and Q likewise. This method of converting I,Q numerical samples to analog waveforms for modulating a quadrature modulator is described in U.S. Pat. No. 5,530,722 and entitled "Quadrature Modulator With Integrated Distributed RC Filters", which is incorporated herein by reference. The advantage of high bitrate delta-sigma conversion is that low-pass filters 204 and 205 are simplified. The advantage of the balanced form of delta-sigma convertor and low pass filters disclosed in the incorporated application is to reduce unwanted carrier components in the modulated output caused by DC offsets.

Figure 5A:
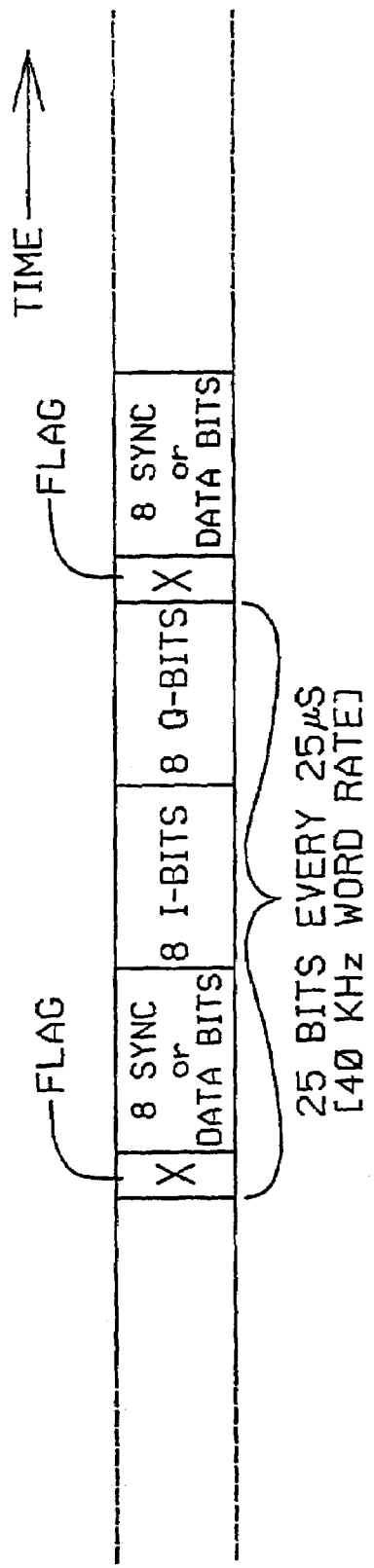
FIG. 5 illustrates serial data formats conforming to the present invention.
Figure 5B:
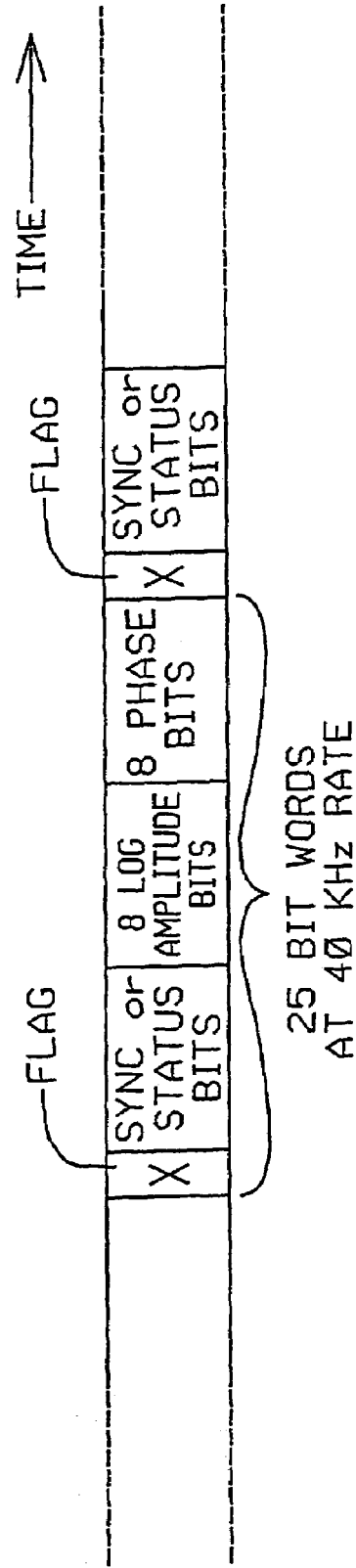

FIG. 5 illustrates a suitable serial bitstream format for the handset to adapter and from the adapter to the handset. 25-bit words are transmitted at a 40 Kword/sec rate giving a 1mbit stream, derived from the handset reference crystal in the handset-to-adapter direction and from the adapter reference crystal in the adapter-to-handset direction. The 25-bit word consists normally of a start bit or flag equal to binary 1, an 8-bit sync pattern and 8-bit 1 and 8-bit Q values. The I and Q values are transmitted at a rate of 40K samples per second, which is 5 times an 8 KB/s modulated bitrate carried by the I and Q waveforms, or ten times the Nyquist rate assuming QPSK modulation. By making the flag bit alternatively a binary 0, the handset indicates as illustrated in FIG. 6 that the sync bits instead carry command information 8-bits at a time. By holding the flag at 0 for however many consecutive 25-bit words as necessary, any number of bytes of command information may be conveyed. For example, commands can consist of 4 bytes, comprising an 8-bit address (denoting a synthesizer for example) and 24 bits of data (denoting a frequency for example).

A similar format may be used in the reverse direction, where I,Q bytes are replaced by phase and amplitude bytes, and where command bytes are replaced by status bytes when the flag is a zero, as commanded by handset-to-adapter commands.

Serial data streams containing multiplexed information must be synchronized at the receiving demultiplexer to determine the word boundaries. It is not the purpose of the disclosure to describe such prior art techniques. It suffices to say that the inclusion of flag bits in regular positions with associated known sync patterns provides sufficient data for the receiving demultiplexer to obtain synchronism using known sync search techniques and to maintain synchronization using known flywheel sync techniques. The similarity of the format in both directions allows a similar synchronizing circuit design to be used at both ends.

Another purpose of the inventive interface 700 however is to synchronize the reference oscillator 307 accurately to the handset reference oscillator, or vice versa. A clock comparator in the demultiplexer 606 determines whether the rising or falling edges of corresponding bits transmitted and received over the serial links (e.g., sync bits) are early or late with respect to each other. For example, if the first sync bit transmitted from the adapter through the multiplexer 607 occurs later than the reception of the same bit through the demultiplexer 606, then the adapter's reference is deemed to be running slow and its frequency should be increased. It is an optional design choice whether circuitry to compute a new code for the DtoA convertor 604, is contained in the adapter, or whether such early/late decisions are merely reported in the status bits transmitted to the handset, and the computation to update the DtoA converter 604 code is contained in the handset. Since it has also been indicated that a similar circuit to the multiplexing circuit 601 may be suitable for inclusion in the handset, it is possible alternatively for the handset circuit to comprise comparison of transmitted and received bitstream timings in order to determine early/late decisions which may then be used to update the DtoA convertor code transmitted to the adapter or used to update the handset's internal reference oscillator. It is preferable to permit all options, and to determine whether the handset's or the adapter's reference oscillator is the one to be adjusted depending on whether the former has previously been adjusted to an accurate cellular base station used as a frequency reference. The objective guiding the design or operation of such an algorithm, which may comprise part of the handset software, is to obtain the best transmit frequency accuracy for a satellite mode transmission by using either previous cellular frequency error measurements or current satellite frequency error measurements, whichever is of greatest reliability. Moreover, temporary adjustments to the handset reference are permitted by storing a DtoA convertor 604 code previously determined while locked to a cellular system, and retrieving it from memory when next locked to a cellular system. In this way, future frequency refinements to frequency adjustments to the satellite or cellular system may be kept independent of each other.

Since an object of the invention was to simplify the connection between the handset and the satellite adapter, the serial control clock shown accompanying serial control data on interface 600 was omitted from interface 700 to save pins. However, if pins are available, a 1 MHZ clock or alternatively a 40 KHz word strobe or both can be connected between the handset and the adapter to simplify bit or word synchronization while retaining the spirit of the inventive satellite communication adapter. The different trade-offs between the numbers of wires and the signal bandwidth or bitrate carried by each merely represent different implementations. It is possible to multiplex both directions onto a single wire plus ground (or single pair) by transmitting bursts of data alternately in each direction by using a time duplexer.

Figure 7:
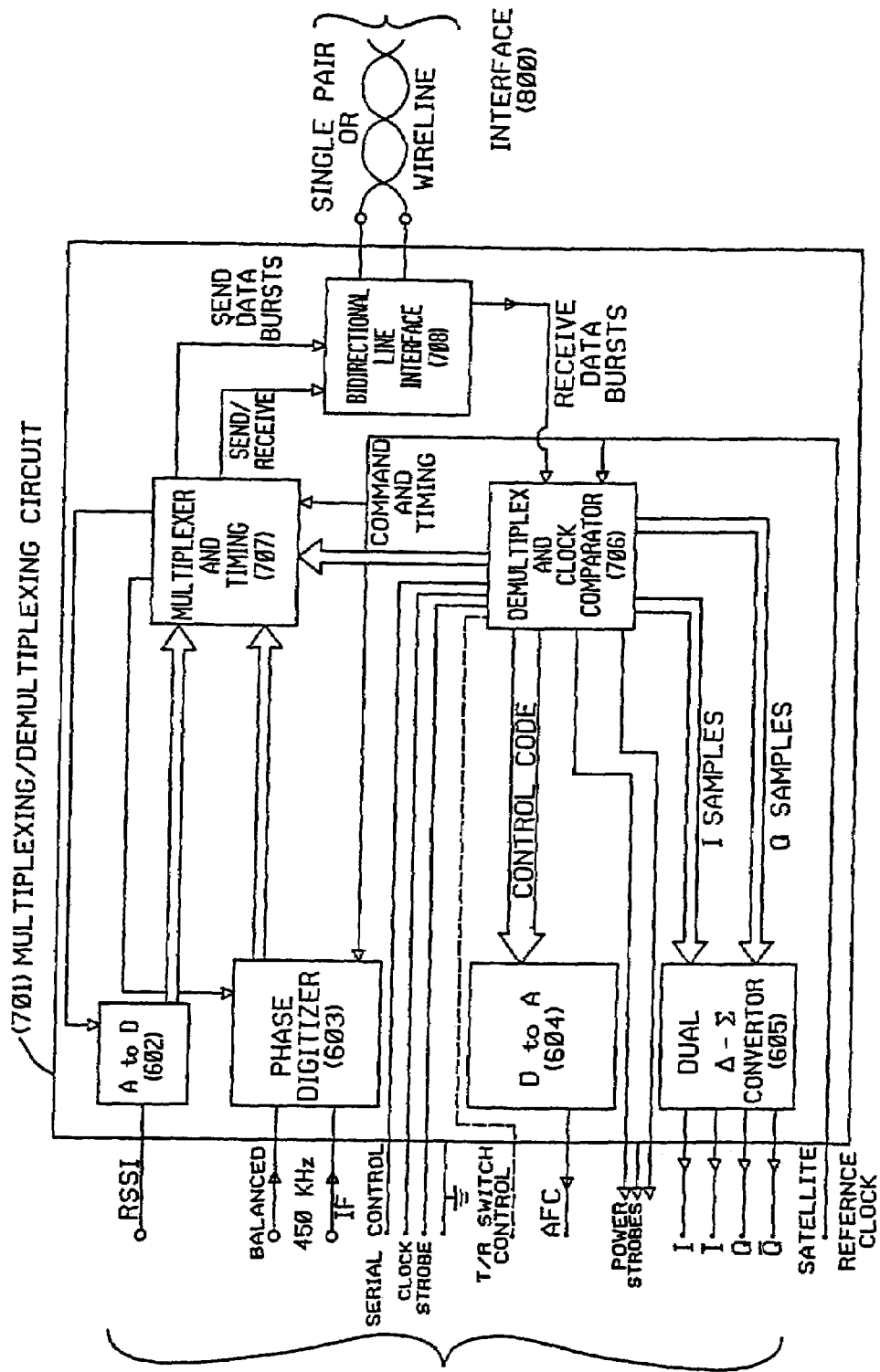
FIG. 7 illustrates a single wire pair interface according to the present invention.

This final step of using time duplex along a single wireline pair is illustrated in FIG. 7. The interface circuit 701 contains a modified multiplexer and demultiplexer 706 and 707 and a new bidirectional wireline interface circuit 708. The modifications to the multiplexer and demultiplexer 706 and 707 adapt them respectively to receive and transmit alternate data bursts instead of continuous data. To accommodate for data in both directions, the serial bitrate must be raised to approximately double the previous 1 MB/s rate. A suitable bitrate is 13 MHz/5 which is equal to 2.6 MB/s.

A burst rate of 40 KHz in each direction is maintained. Each go-and-return cycle period contains 65 bit periods at 2.6 MB/s of which, for example, 25 bit periods may be used for transmitting data words in one direction and 25 bit periods for data words in the other direction, the data words conforming to the exemplary format of FIGS. 5 and 6. The remaining 15 bit periods may be used for guard time between transmit and receive bursts to allow the bidirectional line interface 708 to switch direction. The early/late clock comparator contained in the demultiplexor 706 operates as before, except that the timing of bit reception from the handset is compared with the internal timing of the multiplexer 707, which is the bit timing it would have used had it been permitted to transmit. The timing comparison effectively checks that data is received from the handset midway between the transmission of two 25-bit words from the multiplexer 707 and generates an early or late indication. To assist in initial sync or sync recovery, the multiplexer 707 is inhibited from transmission if the demultiplexer 706 does not detect synchronization with the signal from the handset.

The description so far has concentrated on wire connection of the handset to the inventive satellite communication adapter. In U.S. Pat. No. 5,428,668, a Home Base Station was disclosed for translating a call received via a normal, loop-disconnect interface with the public switched telephone network P5114 through a domestic telephone jack outlet into a call to a cellular phone using a low power transmitter, and vice versa. A call received from a cellular phone at low power is translated by the Home Base Station into a normal loop-disconnect telephone jack interface with the PSTN.

According to one embodiment of the present invention, the Home Base Station is equipped with an additional interface for connection to the inventive satellite communication adapter. This interface can be any of the interfaces described above and denoted as interfaces 600, 700 or 800 respectively in FIGS. 3, 4 and 7. The common principle is that the satellite communication adapter is principally just an RF convertor and relies upon the Home Base Station's digital signal processing to process satellite signals. Thus, signals received from the satellite and converted by the adapter illustrated in FIG. 3 are fed to the Home Base Station using signal interfaces 600, 700 or 800 and then processed into cellular signals which are transmitted by the Home Base Station to a cellular handset, such as the handset disclosed above having said inventive interface, or alternatively to any suitable cellular handset. Likewise, signals transmitted from said cellular handset are received by said Home Base and converted to satellite signals that are transmitted over the interface 600, 700 or 800 to the inventive satellite communication adapter for transmission to the satellite. In the event that the Home Base Station is also connected to the PSTN via a loop-disconnect telephone jack outlet, calls received either from the satellite or via the PSTN may be translated to calls to the same cellular handset. In this way, the inventive satellite communication adapter comprises a directional antenna that must be pointed at the satellite can be set up at one location and used by a handset in another location by use of normal cellular circuits and transmission protocols as a wireless connection. For handset initiated calls, the decision to place them via the PSTN or the satellite can depend on availability and a priority indication provided by the user. For example, said Home Base Station can be set to give priority to placing handset initiated calls via the route offering the lowest tariffs. A local call would be placed via the PSTN for example, while an international call may be placed via the satellite system. Discrimination between local and international calls may be made by the Home Base Station by processing the digits of the called number and referring to a table of user-programmed preferred routing information. In addition, the handset may independently choose to use a local cellular system if available as an alternative to the satellite or PSTN routing options.

Figure 8:
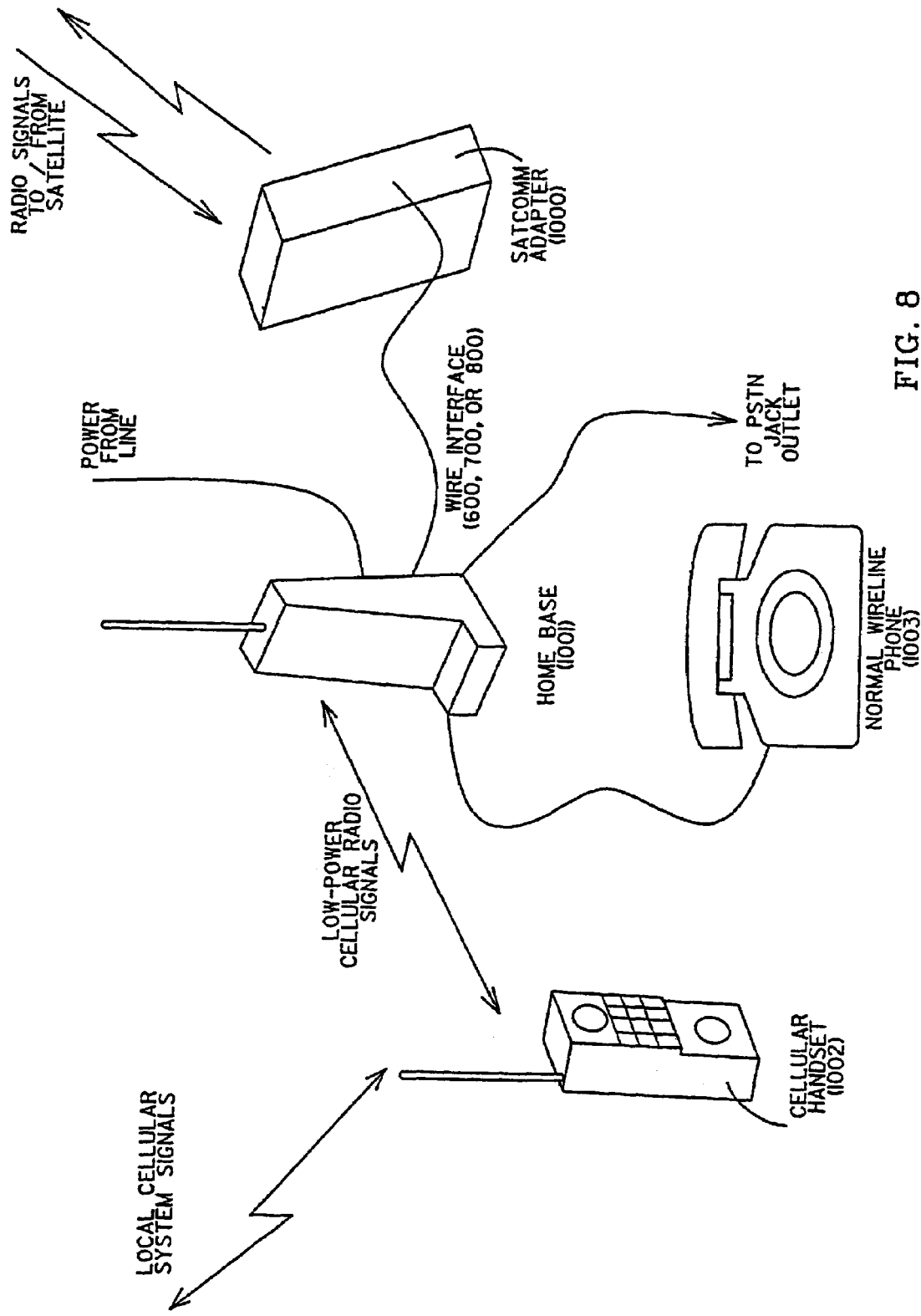
FIG. 8 illustrates a wireless connection to a cellular handset according to the present invention.

FIG. 8 illustrates these call routing options. The Inventive Home Base Station 1001 is connected to the inventive satellite communication adapter 1000 by means of any of the aforementioned interfaces. Since the Home Base Station is also conceivably a battery charger in which the handset is parked when not in use, it may in principle also function as a power source or charger for the adapter 1000 by adding appropriate power connections in the cable interface. The Home Base. Station draws power from the power line for this function. The function of the Home Base Station can comprise causing the handset to ring by non-radio means when parked in the charge position, and performs a wireless call set-up with the handset first upon detection that the handset is removed from the charger to answer the call. Alternatively, an interface with the normal wireline phone is optionally provided, and calls may be made or answered using the wireline phone by non-wireless communication with the Home Base/satellite communication Adapter combination. In this configuration, whichever phone is picked up or answered first, the cellular handset or the normal phone, can determine whether a wireless or wired connection is first activated.

If desired, the function of the Home Base Station can be programmed to activate the cellular wireless connection to the cellular handset if it is later picked up subsequent to answering the call originally with the wireline phone. Other options such as allowing a call to be monitored both on the wireline phone and the wireless handset, regarded as separate extension phones can be programmed. Furthermore, a call answered using the wireline phone while the cellular phone is disconnected from the charging position, thereby terminating the radiation of a cellular call signal by 1001) can in principle be picked up from the wireline phone later by the cellular phone through dialling its number. The Home Base Station can be programmed to recognize cellular signals containing a call to the PSTN Jack it is connected to and to connect those to the wireline phone directly, either for talking with the wireline phone or for picking up an existing call to the wireline phone. Attempts to pick up a call from the wireline phone can be either permitted or blocked, in the latter case by issuing a busy signal to the cellular handset.

It will also be appreciated by a person skilled in the art that any of the inter-unit connections illustrated in FIG. 8 as being completed with electrical cables can equally be accomplished using optical fiber. Such options and alternate interfaces between a satellite communication adapter, a cellular handset or a Home Base Station designed by a person skilled in the art are all considered to lie within the spirit and scope of the invention as described by the following claims.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed:

1. In a dual-mode satellite/cellular telephone system including a cellular telephone, a satellite-cellular communications adapter, separate from said cellular-telephone, said communications adapter comprising:

a converter for converting satellite signals received from an orbiting satellite into information signals for use by said cellular telephone and for converting-information signals received from said cellular telephone into satellite signals for transmission to the orbiting satellite; and an interface for connecting said communications adapter to said cellular telephone and for communicating information signals between said adapter and said cellular telephone, wherein information signals communicated via said interface said cellular telephone to said adapter include balanced in-phase and quadrature drive signals, and wherein information signals communicated from said adapter to said cellular telephone include an intermediate frequency signal.

2. An adapter according to claim 1, wherein information signals communicated from said cellular telephone to said adapter further include an automatic frequency change signal and a serial digital control signal, and wherein information signals communicated from said adapter to said cellular telephone further include a received signal strength indicator signal.

3. An adapter according to claim 1, wherein said interface comprises a multi-pin connector and electric cabling.

4. An adapter according to claim 1, further comprising a multiplexing/demultiplexing circuit for combining and serializing information signals communicated between said cellular telephone and said communications adapter.

5. An adapter according to claim 4, wherein said interface comprises one of electrical cabling and fiber optic cabling.

6. An adapter according to claim 4, further comprising a bi-directional line interface coupled to said multiplexing/demultiplexing circuit.

7. An adapter according to claim 6, wherein said interface comprises a single twisted wire pair.

* * * * *

UNITED STATES PATENT AND TRADEMARK OFFICE
CERTIFICATE OF CORRECTION

PATENT NO.       : 7,221,905 B2
APPLICATION NO.  : 10/274763
DATED            : May 22, 2007
INVENTOR(S)      : Dent It is certified that error appears in the above-identified patent and that said Letters Patent is hereby corrected as shown below:

Column 6, Line 6: Please correct "38 MHz=" in equation to read --39 Mhz= --

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,221,905 B2  Page 1 of 1
APPLICATION NO. : 10/274763
DATED : May 22, 2007
INVENTOR(S) : Dent It is certified that error appears in the above-identified patent and that said Letters Patent is hereby corrected as shown below:

In Column 4, Line 22, delete "I,I,Q,Q" and insert -- I,$\underline{I}$,Q,$\underline{Q}$ --, therefor.

In Column 8, Line 28, delete "I,I,Q,Q" and insert -- I,$\underline{I}$,Q,$\underline{Q}$ --, therefor.

In Column 8, Line 55, delete "en-or" and insert -- error --, therefor.

In Column 9, Line 5, delete "satelllite" and insert -- satellite --, therefor.

In Column 10, Line 15, after "I,Q and" delete "I,Q" and insert -- $\underline{I}$,$\underline{Q}$ --, therefor.

In Column 10, Line 32, delete "Imbit" and insert -- 1mbit --, therefor.

In Column 10, Line 36, delete "8-bit l" and insert -- 8-bit I --, therefor.

In Column 12, Line 6, delete "demultiplexor" and insert -- demultiplexer --, therefor.

In Column 12, Line 22, delete "P5114" and insert -- PSTN --, therefor.

Signed and Sealed this

Tenth Day of June, 2008

JON W. DUDAS
*Director of the United States Patent and Trademark Office*